United States Patent [19]
Leiber et al.

[11] 4,054,328
[45] Oct. 18, 1977

[54] AUTOMATIC ANTILOCK CONTROL SYSTEM

[75] Inventors: Heinz Leiber, Leimen; Jürgen Gerstenmeier, Waldhilsbach; Wolfgang Korasiak, Ketsch, all of Germany

[73] Assignee: Teldix GmbH, Heidelberg, Germany

[21] Appl. No.: 632,917

[22] Filed: Nov. 18, 1975

[30] Foreign Application Priority Data
Dec. 21, 1974 Germany .............................. 2460904

[51] Int. Cl.² ........................................... B60T 8/02
[52] U.S. Cl. .................................. 303/103; 303/106
[58] Field of Search ............... 188/181; 235/150.2; 303/20, 21, 91–112; 307/10 R; 317/5; 324/161–162; 340/53, 62

[56] References Cited
U.S. PATENT DOCUMENTS

| | | | |
|---|---|---|---|
| 3,677,609 | 7/1972 | Davis et al. | 303/21 P X |
| 3,888,550 | 6/1975 | Reinecke et al. | 303/21 P |
| 3,930,688 | 1/1976 | Rau et al. | 303/21 A X |
| 3,958,835 | 5/1976 | Rothfusz et al. | 303/103 |

Primary Examiner—Stephen G. Kunin
Attorney, Agent, or Firm—Spencer & Kaye

[57] ABSTRACT

An automatic antilock control system for vehicles comprises a sensor which determines the presence of a tendency of a wheel to lock, a brake pressure open loop control device for varying the brake pressure at the said wheel and controlled by an evaluation circuit responsive to the sensor, the evaluation circuit including switch apparatus for producing open loop control signals which achieve a steep brake presence variation during an antilock control operation and thereafter achieve a further slower pressure variation, and open loop control apparatus for varying the duration of the pressure variation in dependence on the duration of the steep pressure variation of the previous cycle.

17 Claims, 8 Drawing Figures

AUTOMATIC ANTILOCK CONTROL SYSTEM

BACKGROUND OF THE INVENTION

The invention relates to an automatic antilock control system for vehicles.

One such system comprises a sensor for determining a tendency of a vehicle wheel to lock, an evaluation circuit for processing the sensor signals and for producing control signals and a brake pressure control device with at least one magnetic valve, to which are fed these control signals for the variation of the brake pressure, wherein the evaluation device and the brake pressure control device are designed in such a manner that a pressure build-up with variable pressure gradients is possible.

Such an automatic antilock control system is known, for example, from German Accepted Patent Specification No. 1,166,012. In the case of this known automatic control system, throttle valves are provided in addition to an inlet and an outlet valve, so that a throttled pressure build-up and pressure reduction can be achieved in addition to a rapid pressure build-up and pressure reduction. The variable pressure gradients rendered effective as a result of the variable rotary behaviour of the wheel.

From the German Published Patent application No. 1,914,765 there is known an automatic antilock controller, in which the variable pressure gradients are realised on pressure build-up and/or reduction by open-loop control of the valves with pulses. In fact, this Published Patent application describes the possibility of producing such variable pressure gradients, but nothing is stated regarding the sequence of the application of these variable gradients.

SUMMARY OF THE INVENTION

It is an object of the invention to so control the pressure build-up that there is as little as possible brake hysteresis on one hand and after the end of a pressure reduction, an effective brake pressure is achieved again as rapidly as possible, but however the brake pressure increase is not so rapid on the other hand, that the brake pressure, on build-up, overshoots far beyond the optimum brake pressure.

According to a first aspect of the invention, there is provided an automatic antilock control system for vehicles comprising a sensor for determining a tendency to lock of a vehicle wheel, a brake pressure control device for varying the brake pressure at the brakes of said vehicle wheel, an evaluation circuit for processing signals from said sensor and producing control signals for controlling said brake pressure control device, circuit means in said evaluation circuit for producing control signals for producing a steep pressure variation and thereafter a slower pressure variation in the same direction as the steep variation in the course of an antilock control phase, and control means in said evaluation circuit for varying the duration of said steep pressure variation in dependence on the duration of the steep and slower pressure variations in at least the preceding cycle.

According to a second aspect of the invention, there is provided an automatic antilock control system for vehicles comprising a sensor for determining a tendency to lock of a vehicle wheel, a brake pressure control device for varying the brake pressure at the brakes of said vehicle wheel, an evaluation circuit for processing signals from said sensor and producing control signals for controlling said brake pressure control device, circuit means in said evaluation circuit for producing control signals for producing a steep pressure rise with a steep gradient after a pressure reduction triggered by a locking tendency and thereafter a slower pressure rise and control means in said evaluation circuit for varying the duration of the pressure rise in dependence on the duration of said steep pressure rise of at least the previous cycle.

BRIEF DESCRIPTION OF THE DRAWINGS

The invention will now be described by way of example, with reference to the drawings in which.

DESCRIPTION OF THE PREFERRED EMBODIMENTS

Figure 1A:
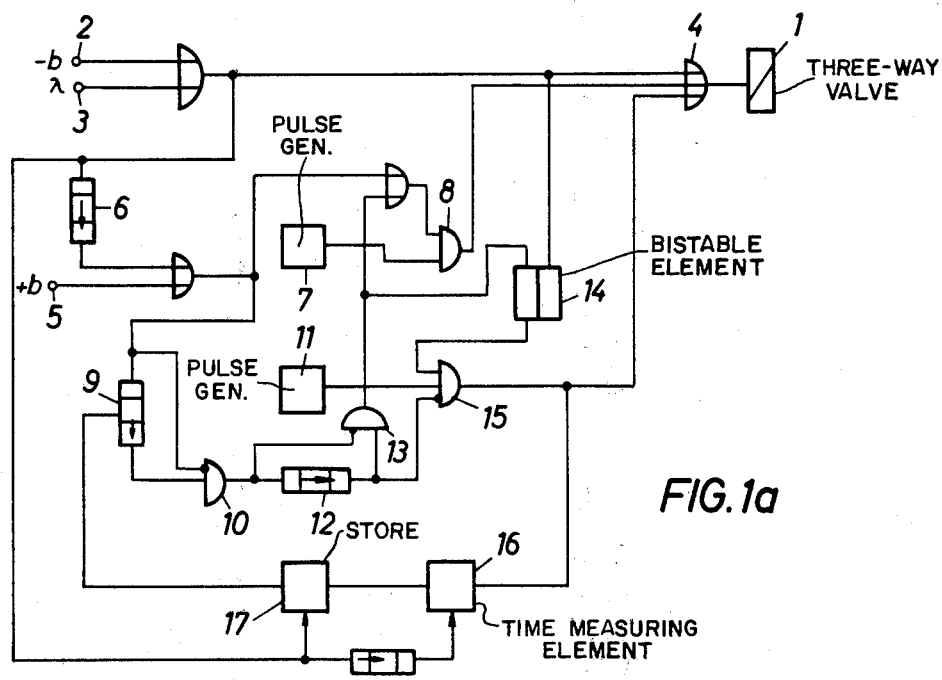
FIG. 1a shows a first embodiment of the invention with a three-position valve.

Basically, in a preferred embodiment, the invention provides that, in an automatic antilock control system as mentioned at the outset, the evaluation circuit contains circuit means for producing such control signals, that, after a pressure reduction triggered by a tendency to lock, firstly a steep pressure increase and thereafter a less steep pressure increase takes place and in that the evaluation circuit contains control means which makes the duration of the steep pressure increase in one control cycle dependent on the extent of the pressure rise in the preceding cycle or the preceding cycles in such a manner that, with an increasing duration of the pressure increase in the preceding cycle, the duration of the steep pressure increase becomes greater.

When taking into account the pressure increase of a plurality of preceding cycles, a means value is formed.

The solution discussed above is also usable in the case of pressure reduction, wherein the pressure reduction is first taken up rapidly and then slowly and the extent of the preceding steep pressure rise is used as a value for influencing the steep pressure reduction. Also the following teachings are applicable, in accordance with the invention to the pressure reduction with corresponding modification or adaptation. The teaching in accordance with the invention can be used merely for the pressure build-up and for the pressure reduction. However also a pure pressure reduction can be effected in accordance with the fundamentals of the invention.

In order to make the steep pressure rise or reduction dependent on the preceding pressure rise or reduction, the pressure build-up time or reduction time of the preceding cycle can be measured in toto and the control signal for the steep pressure rise or reduction can be correspondingly dimensioned. When realising the pressure rise or pressure reduction by means of pulse-form control, the number of pulses can also be counted and, in the dimensioning of the following steep pressure rise phase, or steep reduction phase, the pulse number can be taken into account. A counter can be provided for this, to which are fed these pulses of the slow pressure build-up or reduction and the counter state of which is taken into account in the dimensioning of the pressure rise or reduction phase.

The steep pressure rise or reduction phase can be pre-specified to be constant in the first control cycle and will be preferably chosen to be so small that, during the first steep pressure rise or reduction phase, as far as possible, a pressure which is too high or too low is never achieved by the open-loop control. The design should here thus be such that the duration of the steep pressure rise or reduction in the second cycle relative to the first cycle is only increased or, at most, can remain the same but never be reduced.

Instead of making the duration of the phase of the steep pressure variation in the first cycle constant, this duration can also be made dependent on the first pressure reduction phase or, for pressure reduction, on the preceding pressure build-up phase. It would also be possible to use the vehicle deceleration as a value for influencing the pressure build-up phase, wherein, in the case of a large vehicle deceleration, the steep pressure rise phase increases. Instead of the vehicle deceleration, the brake pressure can also be used as the value influencing the pressure build-up phase wherein a higher brake pressure means an extension of the steep pressure build-up or reduction phase. Also the pressure difference achieved on the pressure reduction in the first control cycle can serve as an influencing value. Finally the temperature of the pressure medium can also serve as an influencing value, since, in fact, even this enters into the extent of the pressure reduction.

If a check cycle is employed, for example, at the start of the control, measurement means can be provided which measure the time from the start of the pressure build-up after the first pressure reduction up to the attainment of a certain rotary behaviour of the wheel (for example a tendency to lock). This time can also influence the time duration of the steep pressure rise in the following control cycle.

In accordance with a further form of the invention, switch means are provided which permit a delay time $T_m$ to become operative between steep and slow pressure rises. A small pressure rise relative to the preceding steep pressure rise can be carried out in this delay time.

Preferably, the pulse width of the pulses, in the case of a pulse form pressure rise during the slow pressure rise or reduction, can be caried in dependence on time in such a manner that, with increasing numbers of pulses, the pressure increase or decrease per pulse rises.

Also the mark/space ratio i.e., the pulse width to pulse space ratio, of the pulse sequence can be varied in dependence on suitable parameters; thus a switch-over from one pulse sequence to another with variable mark/space ratio is possible in dependence on the parameters. Possible parameters are: the duration of the preceding pressure reduction, the pressure difference between preliminary pressure and wheel pressure, temperature of the pressure medium and vehicle deceleration.

The switch-over between different pulse sequences can be controlled by a counter which counts the pulses per control cycle and switches over to a suitable pulse sequence when a specified pulse number has been exceeded or passed downwardly.

Preferably, the total time of the pressure rise or reduction in one cycle is determined and from this, a duration for the steep pressure rise or reduction is derived for the following control cycle, which duration corresponds to this total time minus the build-up or reduction time of one pulse.

In the case of pulsed build-up or reduction, this can occur in such a way that, in addition to the time of the steep rise or reduction, which is expressed as a counter state, the number of the additionally required pulses is added. Then one is to be subtracted from this.

Figure 5:
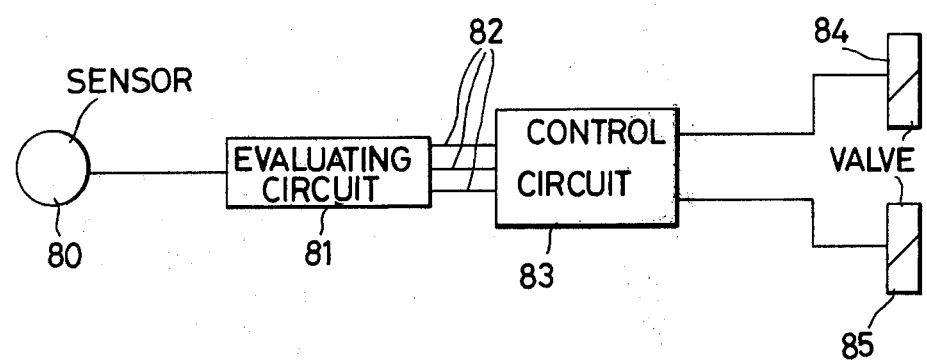
FIG. 5 shows an antilock control system in principle.

In FIG. 5 an antilocking control system is represented in principle. The sensor 80 gives a signal to the evaluating circuit 81, which is proportional to the speed of a wheel of the vehicle. The evaluating circuit 81 generates signals on one of the lines 82, if the wheel deceleration exceeds a given value, a signal on another line if the wheel slip reaches a certain value and a signal on the third line if the wheel acceleration is beyond a given value.

These three signals are fed to a circuit 83 which here controls two valves for pressure variation, valve 84 being a inlet-valve, with which a further pressure build-up at the brakes can be prevented and valve 85 being a valve with which pressure decrease at the brakes can be achieved. Embodiments of the circuit 83 and the valve arrangements controlled by them are represented in FIGS. 1a, 2a, 3a and 4.

Referring now to the drawings, in the case of the embodiment of FIG. 1a, the sensors and the evaluation circuit are not shown for the sake of simplicity. Rather, FIG. 1a shows an control circuit for a three-way valve 1 inserted in the brake line, which valve permits brake pressure build-up at the brake in its unenergised position and in its energised position, reduces the brake pressure at the brake.

Figure 1B:
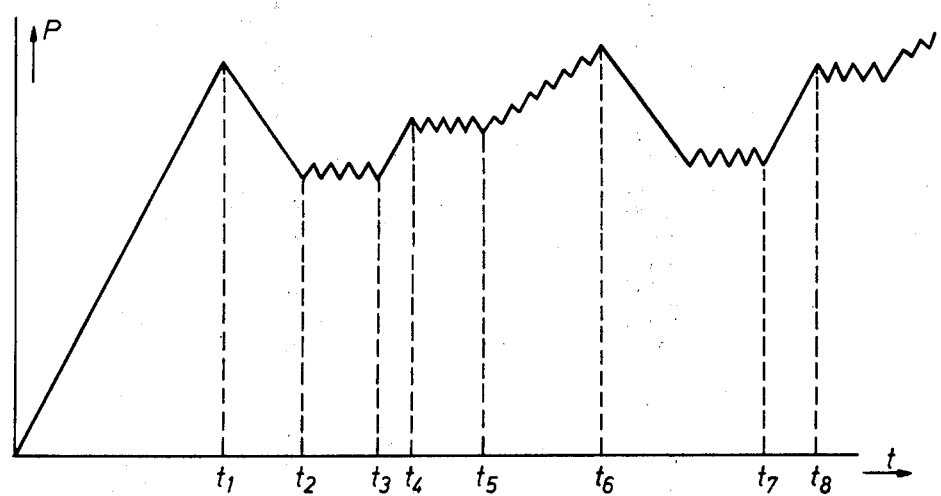
FIG. 1b shows the associated pressure curve.

A signal is introduced at 2, if the monitored wheel exceeds a certain deceleration. At 3, a signal is introduced if the wheel slip reaches a certain value. Each of these signals energises the valve 1 via the OR-gate 4 and thus effects a pressure reduction at the wheel brake until these signals no longer occur. (Time period $t_1$–$t_2$ in FIG. 1b). After this follows a phase in which the pressure is kept constant ($t_2$ to $t_3$ in FIG. 1b), which is determined by the time period during which an acceleration signal ($+b$) is fed in at 5. In the time period between $t_2$ and the start of the $+b$ signal, the brake pressure is likewise kept constant by means of a delay element 6. The maintenance of constant pressure is achieved here by pulse energisation of the valve by a pulse series from a pulse generator 7, the mark:space ratio of which is correspondingly selected. This pulse series is supplied via the AND-gate 8 during the time period $t_2$ to $t_3$.

The control signal for the supply of the pulse series from the pulse generator 7 also passes to the timing element 9. However, the timing element 9 can cause an output signal at the AND-element 10 only after the end of this control signal (that is at $t_3$). This signal then lasts a time corresponding to the time constant of this time element. This signal prevents, in its time duration ($t_3$ to $t_4$), both pulse generator 7 and pulse generator 11, the pulse sequence of which has a mark/space ratio, which generates a pressure build-up in the case of pulse-form energisation of the valve 1, from being able to actuate the valve 1, i.e. a pressure build-up occurs during the time corresponding to the time constants of the time element 9. Since thereafter (that is after $t_4$) the output signal of the AND-gate 10 stops, but the timing element 12 continues to emit a signal in accordance with its time constant, the maintenance of constant pressure is effected once again for this duration ($t_4$ to $t_5$) via AND-gate 13 with an inverted input and AND-gate 8. The signal, which opens the AND-gate 8 changes over the bistable element 14 which thus prepares gate 15. With the end of the output signal of the timing element 12 (at $t_5$), the AND-gate 15 is open to the pulses of the generator 11 because of the negated input and thus, such a pulse-form control of the valve 1 is effected, that in toto a pressure build-up with predetermined gradients occurs ($t_5$ to $t_6$). The bistable element 14 is reset again by the signal occuring when there is a tendency to lock.

The timing element 9 is constructed to be adjustable. The duration of the time of the pulse-form control of the valve 1 is measured in the measuring element 16 (for example, RC element) using the pulses of the generator 11. With the occurrence of a tendency to lock signal (from 2 or 3), an instruction is fed to a store 17 to cause it to store the measured value. The measured value is erased in the measuring element 16 after a delay.

If, in the first control cycle a steep pressure rise was built up for a predetermined short time ($t_4 - t_3 = T_0$), in the following cycles, this time is extended to correspond to a measured time in which a slow pressure rise was necessary, i.e. the time span ($t_8 - t_7 = T_2$) in the second cycle is increased by an amount dependent on the time ($t_6 - t_5 = T_1$), but which is smaller than this time $T_1$. Assuming the same conditions, the locking pressure is already reached after a short period of slower pressure build-up. However this pressure situation is achieved much more quickly by the invention.

Figure 2A:
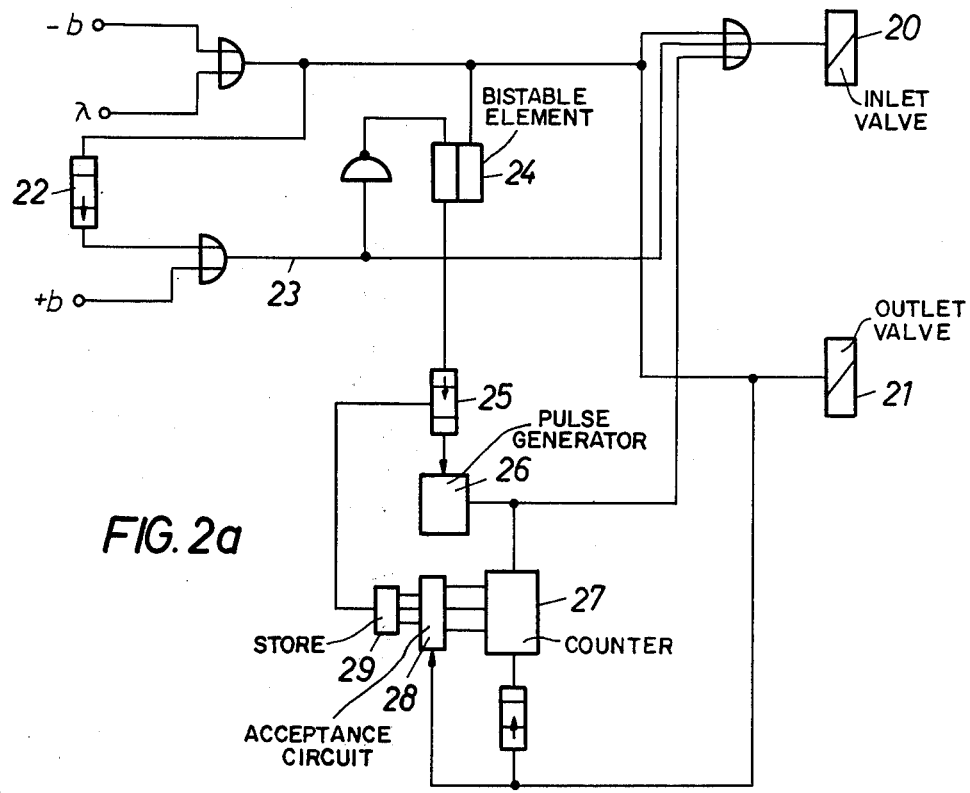
FIG. 2a shows an embodiment with a two-way and a three-way valve.
Figure 2B:
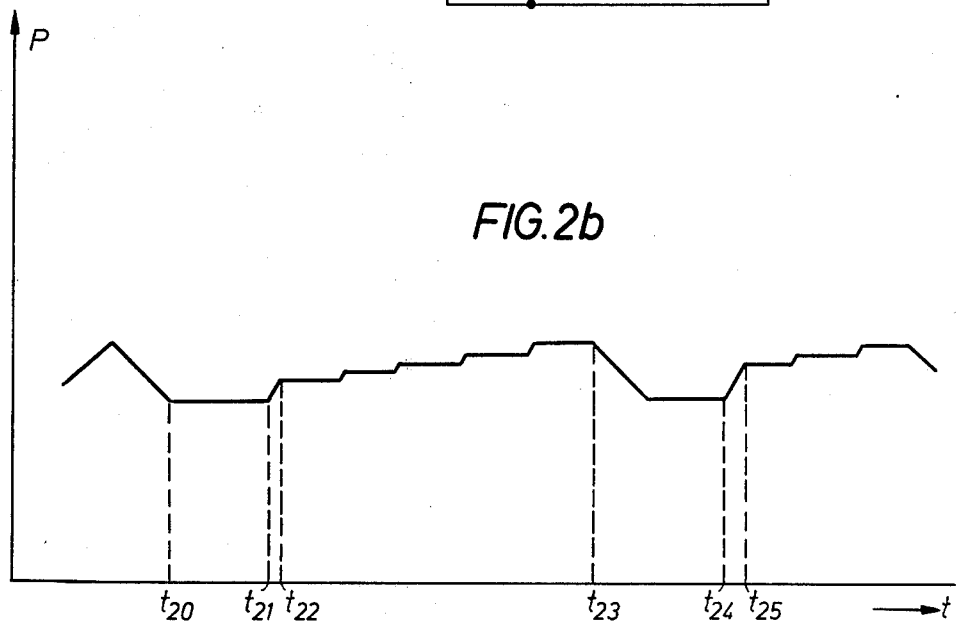
FIG. 2b shows the associated pressure curve.

In the case of the embodiment of FIG. 2a, an inlet and an outlet valve 20 and 21 respectively are provided. These valves are energised by the wheel deceleration signal $-b$ and the termination signal $\lambda$. The timing element 22 and the $+b$ signal maintain the inlet valve 20 closed for a time period, that is, between $t_{20}$ and $t_{21}$ in FIG. 2b during which the pressure is kept constant. With the disappearance of the signal on line 23 for maintaining the pressure constant, the bistable element 24 is changed over by means of an inverter and then permits the timing element 25 to start.

This timing element 25 produces an output signal after a predetermined time, which signal switches on the pulse generator 26. No valve is energised for a corresponding time, i.e. the pressure is built up rapidly (between $t_{21}$ and $t_{22}$). Thereafter the pulse generator 26 determines the pressure gradient ($t_{22}$ to $t_{23}$) by occasional blocking of the pressure build-up. Pressure is reduced again with a renewed tendency to lock, and the bistable element 24 is also reset.

The number of the pulses necessary until the attainment of a new tendency to lock is determined in a counter 27 and is fed via a converter and acceptance circuit 28 to a store 29 when the valve 21 is controlled again. 27 is reset in a somewhat delayed manner. If, for example, the number of the necessary pulses was greater than 3, then, in the following cycle, the time of the rapid pressure build-up ($t_{24}$ to $t_{25}$) is correspondingly increased. It would also be conceivable to begin with a given time for the rapid pressure build-up in the first cycle and, from a predetermined pulse number, to increase this time and to reduce it below another pulse number.

Figure 3A:
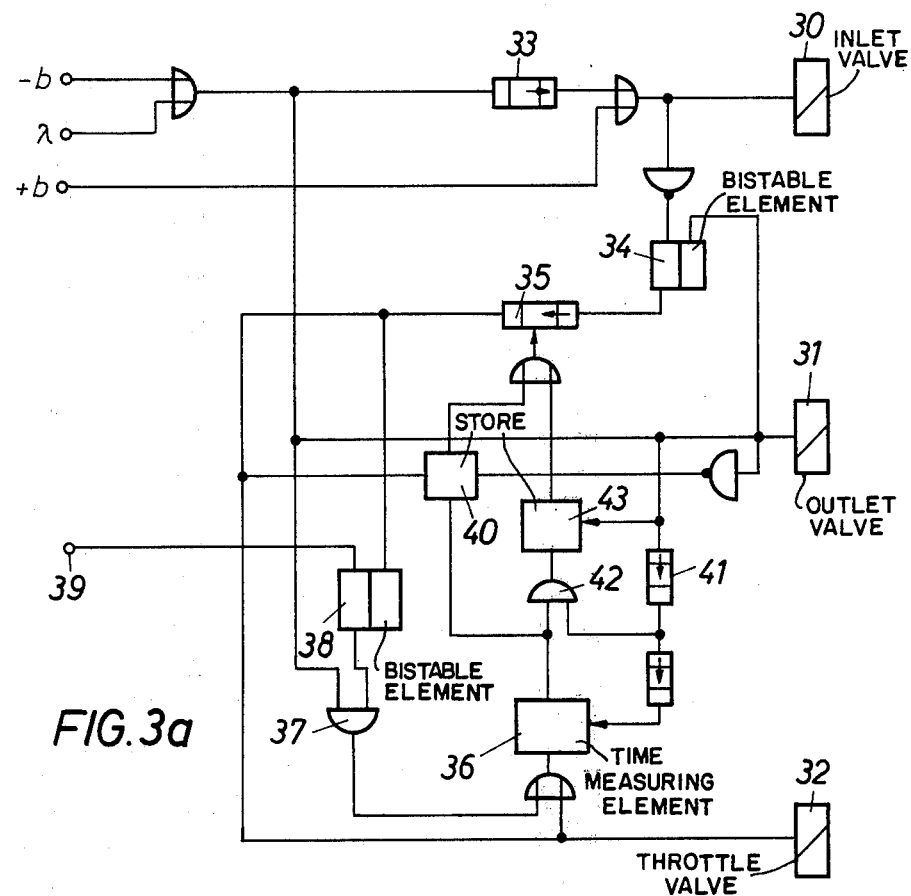
FIG. 3a shows an embodiment with three valves, a throttle valve being provided.

In the case of the embodiment of FIG. 3a there is further provided, in addition to an inlet valve 30 an outlet valve 31, a throttle valve 32, which is in series with the inlet valve and permits a rapid pressure build-up when it is unenergised and a slow pressure build-up when it is energised.

The control of the valves 30 and 31 for pressure reduction is effected again with the help of the deceleration signal $-b$ and of the slip signal; the maintenance of constant pressure phase ($t_{30}$ to $t_{31}$) is effected by the time element 33 and the $+b$ signal.

If the control signal for the inlet valve disappears (at $t_{31}$), then the bistable element 34 is set to start the timing element 35. The latter produces an output signal after a time ($t_{31}$ to $t_{32}$) corresponding to its time constants. In this time, pressure is build-up in a non-throttled manner, but at the end of this time, a signal is fed to the throttle valve 32, which then permits only a throttled build-up. This throttle valve 32 remains energized until pressure is reduced again (at $t_{33}$) and thereby resets the bistable element 34.

Figure 3B:
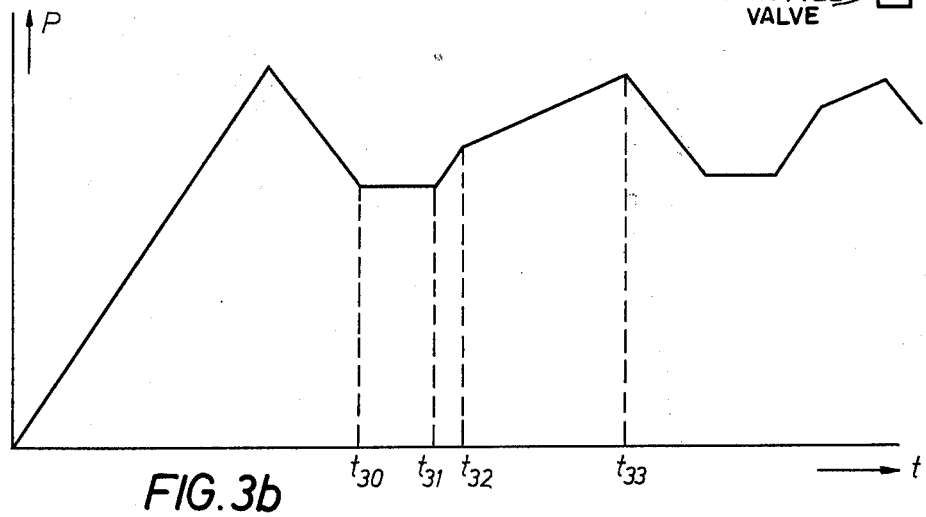
FIG. 3b shows the associated pressure curve.

In the embodiment of FIG. 3a, the time $T_3 = (t_{32} - t_{31})$ is made dependent on the time of the preceding pressure reduction (not taken into account in FIG. 3b). For this there is fed, to a time measurement element 36 via the AND-gate 37, the signal controlling the outlet valve, wherein the AND-gate 37 is kept open by the bistable element 38. This bistable element is set by a signal via terminal 39 at the end of each control and is reset by the first output signal of the timing element 35, so that only the first deceleration or slip signal in a control operation passes to the time measurement element 36. The measurement result is stored in an element 40 as a result of an instruction produced on de-energisation of the outlet valve. This stored value then determines the time constant of the timing element 35 in the first control cycle; thus the pressure build-up time in the first cycle is dependent on the preceding pressure reduction time. The first signal passing to the throttle valve 32 also erases store 40 again.

The time measurement element 36 also measures the period of the response to the throttle valve 32. The measurement result is, on renewed energisation of the outlet valve, passed on into a storage element 43 in a somewhat delayed manner (timing element 41) via AND-gate 42, wherein, shortly before this, the storage element 43 is erased and shortly thereafter, the time measurement element 36 is reset.

The measurement result stored in 43 here determines the time constant of the timing element 35 and thus the time duration of the unthrottled pressure build-up in the individual control cycle. The pressure curve resulting in this case is shown in FIG. 3b.

Figure 4:
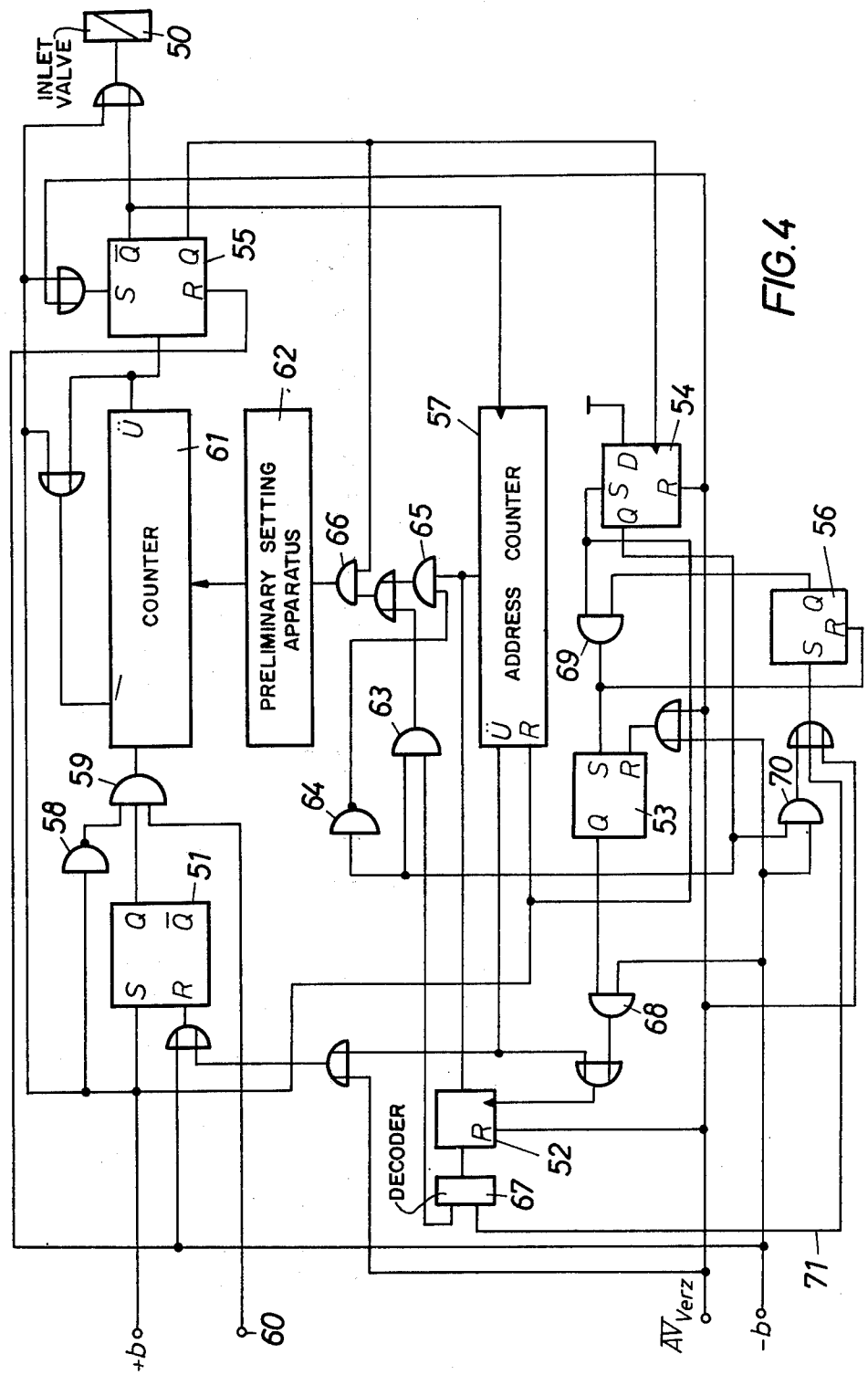
FIG. 4 shows, in detail, a preferred embodiment of the invention with digital evaluation.

In the case of the embodiment of FIG. 4, an inlet and an outlet valve are provided, of which only the inlet valve 50 is shown here. At the end of the preceding closed-loop control i.e., with the appearance of a signal $\overline{AV}_{verz}$, (a signal appearing delayed relative to the disappearance of the outlet valve control signal) bistable elements 51, 53 and 54 are reset via the reset inputs, a store 52 is erased and bistable elements 55 and 56 are set via their set inputs. The first subsequent signal, initiating the control, for example a wheel deceleration signal $-b$, which also controls the outlet valve (not shown) leaves the bistable element 51 reset, but brings the bistable element 55 into its reset position so that the inlet valve is energised via its $\overline{Q}$ output.

The following phase of maintaining the pressure constant consists of a period between the end of the $-b$ signal and the start of the wheel acceleration signal $+b$, during which period, the inlet valve 50 is kept energized via element 55, and the duration of the acceleration signal itself. With the occurrence of the acceleration signal $+b$, the bistable elements 51 and 55, and also 54 are brought into the set position and an address counter 57 is brought into an initial position. Now only the inverter element 58 prevents switching through of the AND-gate 59 during the duration of the acceleration signal and thus prevents the timing pulses from passing into the counter 61 at 60.

With the end of the acceleration signal $+b$, AND-gate 59 becomes open and the inlet valve 50 is no longer energised. At the same time a preliminary setting of the counter 61 by the preliminary setting apparatus 62 is carried out via the load input.

As already stated, the bistable element 54 is in the set position. Thus it opens gates 63 via its Q output and closes gate 65 via an inverter element. Since gate 66 is also kept open by the Q output of the bistable element 55, a predetermined initial value arrives in the preliminary setting apparatus 62 from the decoder 67, which value thus effects a predetermined preliminary setting of the counter 61.

The counter 61 can be a forwards or backwards counter. Firstly it receives such a preliminary setting that it overflows after a few pulses, that is, in a short time, and in so doing emits a signal at Ü and thus changes over the bistable element 55 so that the latter now energises the inlet valve 50 via its $\overline{Q}$ output. The signal at Ü simultaneously causes, via the load input of the counter 61, a new preliminary setting, which determines the length of the subsequent maintenance of constant pressure phase. This time period is stored in 62 and is always effective, if there is no signal at the input of the preliminary setting device 62. The resetting of the bistable element 55 to $\overline{Q}$ shifts the address counter forward by "one." With the expiry of the constant pressure period corresponding to the preliminary setting of the counter, there results a signal at Ü, which permits the element 55 to change over, so that element 54 also changes over into the reset position. It thus blocks gate 63 and opens gates 65 and 66. With this, the address of the counter 57 arrives in the preliminary setting device 62, and finally a new preliminary setting, subject to the counter 57 is fed into the counter 61 by the load control of the counter 61. After the overflow of the counter 61, a new constant pressure phase takes place. Thereafter a new preliminary setting of the counter 61 is carried out and so forth, wherein the preliminary setting device 62 causes, with the increasing addresses of the counter 57, an increase in the time periods, in which pressure is built up. Finally if a new locking signal $-b$ occurs, the bistable element 51 is reset. Likewise the bistable element 55 is reset and thus the inlet valve is again closed and the outlet valve (not shown) is opened. The bistable element 54 is so designed that it can no longer be changes over by a further pulse from $\overline{Q}$.

The occurrence of the $-b$ signal also causes a storage instruction to arrive at the store 52 via the AND-gate 68 if the bistable element 53 is in the set position. This store stores the instantaneous state of the address counter 57. At the beginning of the pressure build-up in the next control cycle, the decoder 67 converts this storage value into a valve which, via the presetting device 62, gives a preliminary setting to the counter 61 and thus a certain first pressure rise time in the cycle. Four different first rise times can be prespecified, for example, by the decoder, namely a smallest time effective in the first cycle, on requiring one - two additional pulse for pressure rise (position one and two of the counter 57) a second, approximately twice as large a time and finally still larger, further times, which are effective in the case of higher counter positions.

The $+b$ signal coming at the end of the $-b$ signal again sets the bistable stages 51 and 55 as well as 54, so that, with the new value stored in the store 52, the second cycle starts similarly to the first.

Just now it was mentioned that, for the storage in 52, the bistable element 53 must be in the set state. This is the case in the first cycle, since the bistable element 56 is brought into the set position by the $\overline{AV}_{verz}$ signal at the beginning, so that, with the occurrence of the $+b$ signal, the AND-gate 69 becomes open for a short time and thus the bistable element 53 is set. Its "resetting" is effected with the occurrence of $-b$ signal.

Since it is a question of a renewed setting of the bistable element 56 in the control operation only under special conditions, the value to be stored in the store 52 is normally determined in the first cycle and maintained for the other control cycles. In the example shown, there are only three exceptions to this, and these are not absolute:

1. Via the connection line 71, which connects the decoder 67 to the element 56, the element 56 remains set until the decoder has left its initial position, i.e. as long as the decoder maintains its initial position, the decoder value can be varied.
2. If there occurs in the time periods, in which the bistable element 54 has an output signal at Q, that is to say during the rapid pressure build-up at the beginning of the pressure build-up and the subsequent pressure holding phase, a deceleration signal, then AND-gate 70 is opened and sets the bistable element 56 again. With this, in the case of the next $+b$ signal, there is a renewed setting of the bistable element 53 and thus AND-gate 68 is prepared for the formation of a further storage instruction during a control. The storage takes place at the next $-b$ signal. This correction of the storage value occurs, if, in the course of the control, it turns out that the time period, subject to the storage value, is too great for the pressure build-up. If it is not too large, then the storage value is varied only further, if
3. so many additional pulse stages are required that the counter 57 overflows at a predetermined setting. This signal occurring at Ü causes at once an immediate changing back of the bistable element 51 and thus a blocking of the pulse-form pressure build-up. Rather the pressure is now rapidly increased and, simultaneously, due to the Ü signal, a storing of the high counter state in the store 52 and thus a long pressure build-up phase to the beginning of the next pressure build-up is effected. This is initiated by the following pressure reduction at the ends of the $-b$ and $+b$ signals. With this it is ensured that, in the case of varying relationships, the slow pressure build-up does not last too long, but a correction of the initial value is carried out. In all other cases the initial value, determined first, remains in existence for the whole control.

It will be understood that the above description of the present invention is susceptible to various modifications changes and adaptations.

What is claimed is:

1. An automatic antilock control system for the brakes of the wheels of a vehicle comprising: a sensor for determining a tendency to lock of a vehicle wheel, a brake pressure control device for varying the brake pressure at the brakes of said vehicle wheel, an evaluation circuit for processing signals from said sensor and producing control signals for controlling said brake pressure control device, circuit means in said evaluation circuit for producing control signals for producing a steep pressure variation and thereafter a slower pressure variation in the same direction as said steep pressure variation in the course of an antilock control phase, and control means in said evaluation circuit for varying the duration of said steep pressure variation in dependence on the duration of said steep and slower pressure variations in at least the preceding cycle, with said dependence being such that the duration of said steep pressure variation becomes longer, the longer the duration of said steep and slower pressure variations in said preceding cycle.

2. A system as defined in claim 1, wherein said circuit means comprises means for producing a steep pressure rise followed by a slow pressure rise.

3. A system as defined in claim 1 wherein the duration of the steep pressure variation is varied in dependence on the duration of said pressure variations in only the preceding cycle.

4. An automatic antilock control system for the brakes for the wheels of a vehicle comprising: a sensor for determining a tendency to lock of a vehicle wheel, a brake pressure control device for varying the brake pressure at the brakes of said vehicle wheel, and evaluation circuit for processing signals from said sensor and producing control signals for controlling said brake pressure control device, circuit means in said evaluation circuit for producing control signals for producing a steep pressure rise with a steep gradient after a pressure reduction triggered by a locking tendency and thereafter a slower pressure rise and control means in said evaluation circuit for varying the duration of said steep pressure rise in dependence on the duration of the pressure rise of at least the previous cycle.

5. A system as defined in claim 4, wherein said control means comprise means for increasing said duration of said steep pressure rise with increases in said duration of said pressure rise in said previous cycle.

6. A system as defined in claim 4, wherein said brake pressure control device comprises at least one magnetic valve.

7. A system as defined in claim 6, wherein said control means comprise means for measuring the duration of the pressure increase and further means for making the duration of the control signals for providing said steep pressure rise dependent on this measurement.

8. A system as defined in claim 6, wherein said control means comprises measuring means for the measurement of the number of pulses occurring during a slow pressure rise brought about by control pulses, which effect a step-form pressure increase, and further means for making the duration of said control signal for said steep pressure rise dependent on the measured number of pulses.

9. A system as defined in claim 8 and comprising a counter shifted by the pulses for slow pressure rise and means in said control means for taking into account the state of said counter in the dimensioning of the steep pressure rise phase of the following cycle.

10. A system as defined in claim 8, and comprising means for providing control pulses dependent on time to provide a pulse form pressure rise the pressure steps of which increase with the number of steps present.

11. A system as defined in claim 8, and comprising means for rendering the pulse width and pulse spacing times of the pulses variable in dependence on the value of at least one parameter.

12. A system as defined in claim 11, and comprising at least two generators for producing said pulses and said generators being switchable over in dependence on the state of at least one parameter.

13. A system as defined in claim 8, and comprising switch means for measurement of the total time, during which the pressure is built up in one cycle, and means for arranging that the time of the steep pressure rise in the next control cycle is dimensioned in such a manner that a pressure build-up corresponding to this total time minus the build-up time of one pulse stage, occurs.

14. A system as defined in claim 13, and comprising means for taking into account the number of the pulse stages in the dimensioning of said time of the steep pressure rise in the next control cycle.

15. A system as defined in claim 6, wherein said control means comprise means for rendering the duration of the steep pressure rise constant in the first closed control cycle.

16. A system as defined in claim 6, and comprising means for rendering the duration of the steep pressure rise in the first control cycle dependent on the duration of the preceding pressure reduction.

17. A system as defined in claim 4, and comprising means for causing the slow pressure rise to become effective only after a delay time, which begins after the end of the steep pressure rise.

* * * * *